3,122,497
METHOD OF REACTIVATING A CRACKING CATALYST

Henry Erickson, Park Forest, Ill., assignor, by mesne assignments, to Sinclair Research, Inc., New York, N.Y., a corporation of Delaware
No Drawing. Filed Sept. 1, 1960, Ser. No. 53,380
4 Claims. (Cl. 208—120)

This invention concerns the removal of metal poisons from a synthetic gel hydrocarbon conversion catalyst which has been contaminated with one or more poisoning metals by use in the high temperature catalytic conversion of feed-stocks containing these metals. The invention may be used as part of an overall metals-removal procedure employing a plurality of processing steps to remove a significant amount of one or more of nickel, vanadium and iron, especially nickel, contained in the poisoned catalyst.

The invention comprises sulfiding the contaminated catalyst with $H_2S$ at an elevated temperature in the range of about 800 to 1300° F. In one procedure designed to remove primarily nickel, the sulfiding is followed by a step or steps for removing the nickel sulfide formed in the invention, as such, or through conversion of the sulfide to volatile or dispersible nickel compounds. Such a procedure may be elaborated by the inclusion of processing steps useful in removing other poisoning metals from the catalyst. Copending patent applications Serial Nos. 763,834, filed Sept. 29, 1958, now abandoned; 842,618, filed Sept. 28, 1959; 849,199, filed Oct. 28, 1959; and 19,313, filed Apr. 1, 1960, describe procedures by which poisoning metals included in a solid oxide hydrocarbon conversion catalyst are removed by subjecting the catalyst, outside the hydrocarbon conversion system, to elevated temperature conditions which put metal contaminants into the chloride, sulfate or other volatile, soluble, dispersible or more available form for removal from the catalyst. This invention is of use in, or in conjunction with, such procedures. This application is a continuation-in-part of the above-mentioned applications Serial No. 763,834, filed Sept. 29, 1958, and 842,618, filed Sept. 28, 1959.

Catalytically promoted methods for the chemical conversion of hydrocarbons include cracking, hydrocracking, reforming, hydroforming, etc. Such reactions generally are performed at elevated temperatures, for example, about 300 to 1200° F., more often 600 to 1000° F. Feedstocks to these processes comprise normally liquid and solid hydrocarbons which at the temperature of the conversion reaction are generally in the fluid, i.e. liquid or vapor, state and the products of the conversion frequently are lower-boiling materials.

In particular, cracking of heavier hydrocarbon feedstocks to produce hydrocarbons of preferred octane rating boiling in the gasoline range is widely practiced and uses a variety of solid oxide catalysts to give end products of fairly uniform composition. Cracking is ordinarily effected to produce gasoline as the most valuable product and is generally conducted at temperatures of about 750 to 1100° F., preferably about 850 to 950° F., at pressures up to about 2000 p.s.i.g., preferably about atmospheric to 100 p.s.i.g., and without substantial addition of free hydrogen to the system. In cracking, the feedstock is usually a mineral oil or petroleum hydrocarbon fraction such as straight run or recycle gas oils or other normally liquid hydrocarbons boiling above the gasoline range.

Solid oxide catalysts have long been recognized as useful in catalytically promoting conversion of hydrocarbons. For cracking processes, the catalysts which have received the widest acceptance today are usually activated or calcined predominantly silica or silica-based, e.g. silica-alumina, silica-magnesia, silica-zirconia, etc., compositions in a state of slight hydration and containing small amounts of acidic oxide promoters in many instances. The oxide catalyst may be alumina- or silica-based and ordinarily contains a substantial amount of a gel or gelatinous precipitate comprising a major portion of silica and at least one other material, such as alumina, zirconia, etc. These oxides may also contain small amounts of other inorganic materials, but current practice in catalytic cracking leans more toward the exclusion from the silica hydrate materials of foreign constituents such as alkaline metal salts which may cause sintering of the catalyst surface on regeneration and a drop in catalytic activity. For this reason, the use of wholly or partially synthetic gel or gelatinous catalysts, which are more uniform and less damaged by high temperatures in treatment and regeneration, is often preferable. Popular synthetic gel cracking catalysts generally contain about 10 to 30% alumina. Two such catalysts are "Aerocat" which contains 13% $Al_2O_3$, and "High Alumina Nalcat" which contains about 25% $Al_2O_3$, with substantially the balance being silica. The catalyst may be only partially of synthetic material; for example it may be made by the precipitation of silica-alumina on clay, such as kaolinite or halloysite. One such semi-synthetic catalyst contains about equal amounts of silica-alumina gel and clay.

The manufacture of synthetic gel catalysts can be performed, for instance (1) by impregnating silica with alumina salts; (2) by direct combination of precipitated (or gelated) hydrated alumina and silica in appropriate proportions; or (3) by joint precipitation of alumina and silica from an aqueous solution of aluminum and silicon salts. Synthetic catalysts may be produced by a combination of hydrated silica with other hydrate bases as, for instance, zirconia, etc. These synthetic gel-type catalysts are activated or calcined before use.

The physical form of the catalyst varies with the type of manipulative process to which it will be exposed. In a fixed-bed process, a series of catalytic reactors may be used, some being on stream and others in the process of cleaning, regeneration, etc. In circulating catalyst systems, such as those of the fluid catalytic and "TCC" processes, catalyst moves through a reaction zone and then through a regeneration zone. In the fluid process, gases are used to convey the catalyst and to keep it in the form of a dense turbulent bed which has no definite upper interface between the dense (solid) phase and the suspended (gaseous) phase mixture of catalyst and gas. This type of processing requires the catalyst to be in the form of a fine powder, generally in a size range of about 20 to 150 microns. In the "TCC" or "Thermofor" process the catalyst is in the form of beads which are conveyed by elevators. Generally these beads may range in size up to about ½" in diameter. When fresh, the minimum sized bead is generally about ⅛". Other types of process use other forms of catalyst such as tablets or extruded pellets.

One of the most important phases of study in the improvement of catalyst performance in hydrocarbon conversion is in the area of metals poisoning. Although referred to as "metals," these catalyst contaminants may be in the form of free metals or relatively non-volatile metal compounds. It is to be understood that the term "metal" used herein refers to either form.

Various petroleum stocks have been known to contain at least traces of many metals. For example, Middle Eastern crudes contain relatively high amounts of several metal components, while Venezuelan crudes are noteworthy for their vanadium content and are relatively low in other contaminating metals such as nickel. In addition to metals naturally present, including some iron, petroleum stocks have a tendency to pick up tramp iron from transportation, storage and processing equipment. Most of these metals, when present in a stock, deposit in a relatively non-volatile form on the catalyst during the conversion processes so that regeneration of the catalyst to remove coke does not remove these contaminants.

Of the various metals which are to be found in representative hydrocarbon feedstocks some, like the alkali metals, only deactivate the catalyst without changing the product distribution; therefore, they might be considered true poisons. Others such as iron, nickel, vanadium and copper markedly alter the selectivity and activity of cracking reactions if allowed to accumulate. A poisoned catalyst generally produces a higher yield of coke and hydrogen at the expense of desired products, such as gasoline and butanes. For instance, it has been shown that the yield of butanes, butylenes and gasoline, based on converting 60 volume percent of cracking feed to lighter materials and coke dropped from 58.5 to 49.6 vol. percent when the amount of nickel on the catalyst increased from 55 p.p.m. to 645 p.p.m. and the amount of vanadium increased from 145 p.p.m. to 1480 p.p.m. in fluid catalytic cracking of a feedstock containing some metal contaminated stocks. Since many cracking units are limited by coke burning or gas handling facilities, increased coke or gas yields require a reduction in conversion or throughput to stay within the unit capacity.

An alternative to letting catalyst metals level increase and activity decrease is to diminish the overall metal content by raising catalyst replacement rates. Either approach, letting metals level increase, or increasing catalyst replacement rates, must be balanced against product value and operating costs to determine the most economic way of operating. The optimum metal level at which to operate any cracking unit will be a function of many factors including feedstock metal content, type and cost of catalyst, overall refinery balance, etc., and can be determined by a comprehensive study of the refinery's operations.

A further alternative, demetallizing the catalyst, which avoids discarding of expensive catalyst and enables much lower grade, highly metals-contaminated feedstocks to be used, is now possible in this invention. In the process a catalyst contaminated with nickel by use in converting a nickel-containing petroleum feedstock may be treated only for nickel removal, or the catalyst may be treated for vanadium and/or iron removal as well. Further, the catalyst can be treated primarily for removal of vanadium.

Commercially used cracking catalysts are the result of years of study and research into the nature of cracking catalysis, and the cost of these catalysts is not negligible. The cost frequently makes highly poisoned feedstocks less desirable to use in cracking operations, even though they may be in plentiful supply, because of their tendency to damage the expensive catalysts. The expense of such catalysts, however, is justified because the composition, structure, porosity and other characteristics of such catalysts are rigidly controlled so that they may give optimum results in cracking. It is important, therefore, that removing poisoning metals from the catalyst does not jeopardize the desired chemical and physical constitution of the catalyst. Although methods have been suggested in the past for removing poisoning metals from a catalyst which has been used for high temperature hydrocarbon conversions, for example, the processes of U.S. Patents 2,488,718; 2,488,744; 2,668,798, and 2,693,455, the process of this invention is particularly effective to remove nickel and/or vanadium without endangering the expensive catalyst.

In this invention the hydrocarbon petroleum oils utilized as feedstock for a conversion process may be of any desired type normally utilized in catalytic conversion operations. This feedstock contains nickel, sometimes as much as 1.5%, and/or vanadium and usually other metals as well, and the catalyst may be used as a fixed, moving or fluidized bed or may be in a more dispersed state. For typical operations, the catalytic cracking of the hydrocarbon feed would often result in a conversion of about 50 to 60% of the feedstock into a product boiling in the gasoline boiling range. The catalytic conversion system also includes a regeneration procedure in which the catalyst is contacted periodically with free oxygen-containing gas in order to restore or maintain the activity of the catalyst by removing carbon. It will be understood that in this specification and claims "regeneration" refers to this carbon burn-off procedure. Ordinarily, the catalysts are taken from the hydrocarbon conversion system and treated before the poisoning metals have reached an undesirably high level, for instance, about 2%, generally no more than about 1% maximum, content of vanadium, iron and nickel. Sulfiding or any other given step in the demetallization treatment is usually continued for a time sufficient to effect a substantial conversion or removal of poisoning metal and ultimately results in a substantial increase in metals removal compared with that which would have been removed if the particular step had not been performed. The actual time or extent of treating depends on various factors and is controlled by the operator according to the situation he faces, e.g. the extent of metals content in the feed, the level of conversion unit tolerance for poison, the sensitivity of the particular catalyst toward a particular phase of the demetallization procedure, etc.

This invention comprises sulfiding the poisoned catalyst by contacting it with hydrogen sulfide vapors at an elevated temperature in the range of about 800 to 1300° F. Other treating conditions can include a sulfur-containing vapor partial pressure of about 0.1 to 30 atmospheres or more, preferably about 0.5 to 25 atmospheres. Pressures below atmospheric can be obtained either by using a partial vacuum or by diluting the vapor with gas such as nitrogen or hydrogen. The time of contact may vary on the basis of the temperature and pressure chosen and other factors such as the amount of metal to be removed. The sulfiding may run for, say, up to about 20 hours or more depending on these conditions and the severity of the poisoning. Temperatures of about 900 to 1200° F. and pressures approximating 1 atmosphere or less seem near optimum for sulfiding and this treatment often continues for at least 1 or 2 hours but the time, of course, can depend upon the manner of contacting the catalyst and sulfiding agent and the nature of the treating system, e.g. batch or continuous, as well as the rate of diffusion within the catalyst matrix.

This invention performs the function not only of providing the catalyst with sulfur-containing metal compound which may be easily converted to the sulfate or other water-soluble or water-dispersible form, but also appears to concentrate some metal poisons, especially nickel, at the surface of the catalyst particle. Sulfidation has been found useful in removing some amount of each of the principal poisoning metals nickel, iron and vanadium from a siliceous base catalyst. Its effectiveness for removing nickel is increased at the upper portions of the temperature range.

Removal of poisonong metal sulfides from the catalyst may be accomplished by various means including contact of the catalyst with an appropriate aqueous liquid. Removal of the metal sulfides includes separation of the metal sulfide as such from the catalyst as well as procedures which convert the sulfides by one or more operations, to other forms for actual separation of the metal from the catalyst. One such procedure is described in copending application Serial No. 763,833, filed September 29, 1958, now abandoned, incorporated herein by reference. The treating liquids for removal of the metal sulfide as such preferably have a pH slightly on the acid side but basic solutions may contain a complexing or chelating agent for the nickel and/or other metal poisons.

A requisite for metal sulfide removal is use of a liquid so selective as to remove the metals by solution, dispersion, etc., without significantly attacking the silica-alumina, etc. of the catalyst. Acids containing an anion which forms soluble salts with nickel and/or vanadium and/or iron are suitable for use in water solution to dissolve the Ni and/or V and/or Fe sulfides from the surface of the catalyst. Weak inorganic acids, in dilute water solution, such as hydrobromic or hydroiodic or organic acids such as formic or acetic may be used. Strong inorganic acids such as sulfuric, hydrochloric or nitric acids as well as strong organic acids such as benzenesulfonic acid are preferably used in the form of their salts with a weak base such as ammonia or an organic amine, in order to prevent damage to the catalyst itself.

Aqueous solutions containing cyanide or hexametaphosphate ions are useful in forming soluble complexes with the poisoning metals. Organic sequestering agents, such as ethylene diamine tetraacetic acid (EDTA), etc. have been found useful in removing the sulfided metals since they form soluble chelate complexes with the metals and effectively retard redeposition of the poisoning metals on the catalyst surface once they are brought into solution. Ammonium salts have the further advantage that the ammonium radical forms very soluble amine complexes with nickel so that the ammonium salts of strong acids, especially ammonium chloride, are a preferred group of materials for use in aqueous solution to dissolve the poisoning metal sulfides, especially nickel.

The liquid may be applied to the sulfided catalyst at any temperature from ambient temperature upwards. Elevated temperatures approaching the boiling point of water, are preferred, since the solubility of the metal compounds and complexes formed usually increases with increasing temperature, and since heat tends to remove $H_2S$ from the solution. Temperatures above 212° F. and elevated pressures may be used but the results do not seem to justify the added equipment. Contact with the hot catalyst may be sufficient to raise the temperature of the solvent from ambient temperature to around the boiling point. After solvent treatment it may be desirable to wash the catalyst several times with water, also, preferably at an elevated temperature.

Removal of sulfided metal poisons may be accomplished by dissolving the poisoning material in an aqueous medium after oxidative conversion of the sulfide to a form dispersible in this medium. The aqueous medium may be water, but preferably is a very dilute acid. Oxidation after sulfiding may be performed by a gaseous oxidizing agent to convert metal sulfide to sulfate, including oxysulfate, or other water-soluble or dispersible form. Gaseous oxygen, or mixtures of gaseous oxygen with inert gases such as nitrogen, may be brought into contact with the sulfided catalyst at an oxygen partial pressure of about 0.2 atmospheres and upward, temperatures upward of room temperature and usually not above about 1300° F., and times dependent on temperature and oxygen partial pressure. Such gas-phase oxidation is described in copending application Serial No. 763,834, filed September 29, 1958, and is best carried out near 900° F. about one atmosphere $O_2$ and at very brief contact times.

The metal sulfide may be converted to the corresponding sulfate, or other water-soluble or dispersible form, by a liquid aqueous oxidizing agent such as a dilute hydrogen peroxide or hypochlorous acid water solution, as described in copending applications Serial Nos. 763,834, filed September 29, 1958, and 842,618, filed September 28, 1959. The inclusion in the liquid aqueous oxidizing solution of sulfuric acid or nitric acid has been found greatly to reduce the consumption of peroxide. In addition, the inclusion of nitric acid in the oxidizing solution provides for increased vanadium removal. Useful proportions of acid to peroxide to catalyst generally include about 2 to 25 pounds acid (on a 100% basis) to about 1 to 30 pounds or more $H_2O_2$ also on a (100% basis) in a very dilute aqueous solution, to about one ton of catalyst. A 30% $H_2O_2$ solution in water seems to be an advantageous raw material for preparing the aqueous oxidizing solution. Sodium peroxide or potassium peroxide may be used in place of hydrogen peroxide and in such circumstances, enough extra sulfuric or nitric acid could be used to provide one mole of sulfate or two moles of nitrate for each two moles of sodium or potassium.

Another highly advantageous oxidizing medium is an aerated dilute nitric acid solution in water. Such a solution may be provided by continuously bubbling air into a slurry of the catalyst in very dilute nitric acid. Other oxygen-containing gases may be substituted for air. The time required for oxidation is generally at least about 7 to 8 minutes. The oxidation slurry may contain, for instance, about 20% solids and provide about five pounds of nitric acid per ton of catalyst. Studies have shown a greater concentration of $HNO_3$ to be of no significant advantage. Other oxidizing agents, such as sodium peroxide in acid solution, chromic acid where a small residual $Cr_2O_3$ content in the catalyst is not significant, and similar aqueous oxidizing solutions such as water solutions of manganates and permanganates, chlorites, chlorates and perchlorates, bromites, bromates and perbromates, iodites, iodates and periodates, are also useful. Bromine or iodine water, or aerated, ozonated or oxygenated water, with or without acid, also will oxidize the sulfides. The liquid phase oxidation may also be performed by exposing the sulfided catalyst first to air and then to the aqueous nitric acid solution. The conditions of oxidation can be selected as desired. The temperature can conveniently range up to about 220° F. with temperatures of above about 150° F. being preferred. Temperatures above about 220° F. necessitate the use of superatmospheric pressures and no need for such has been found.

After conversion of the poisoning metal, especially nickel, sulfide to a dispersible form, the catalyst can be washed with an aqueous medium, to remove metal compound including the soluble metal chloride produced in the chlorination procedure described below. This aqueous medium, for best removal of nickel, is generally somewhat acidic. Usually the aqeuous wash medium will be somewhat acidic, at least initially, due to the presence of the acid-acting salt or some entrained acidic oxidizing agent on the catatlyst. Ambient temperatures can be used in the wash but temperatures of about 150° F. to the boiling point of water are helpful in increasing solubility. Pressures above atmospheric may be used but the results usually do not justify the additional equipment. Where an aqueous oxidizing solution is used, the solution may perform part or all of the metal compound removal simultaneously with the oxidation. In order to avoid undue solution of alumina from a chlorinated catalyst, contact time in this stage is preferably held to about 3 to 5 minutes which is sufficient for nickel removal.

Alternative to the removal of poisoning metals by procedures involving contact of the sulfided catalyst with aqueous media, nickel and iron sulfide poisons may be removed by conversion of the sulfides to the volatile carbonyls by treatment with carbon monoxide, as described in copending application Serial No. 47,598, filed August 4, 1960, incorporated herein by reference. In such a procedure the catalyst is treated with hydrogen at an elevated temperature during which metal sulfide contaminant is reduced to the elemental state, then treated, preferably under elevated pressure and at a lower temperature, with carbon monoxide, during which nickel carbonyl is formed and flushed off the catalyst surface. Some iron contaminant is also removed by this carbonylation treatment.

Reduction with hydrogen takes place at a temperature of about 800 to 1600° F., at a pressure from atmospheric or less up to about 1000 p.s.i.g. with a vapor containing 10 to 100% hydrogen. Preferred conditions are a pressure up to about 15 p.s.i.g. and a temperature of about 1100 to 1300° F. and a hydrogen content greater than about 80 mole percent. The hydrogenation can be continued until surface accumulations of poisoning metals, particularly nickel, are substantially reduced to the elemental state.

Carbonylation takes place at a temperature substantially lower than the hydrogenation, from about ambient temperature to 300° F. maximum and at a pressure up to about 2000 p.s.i.g., with a gas containing about 50–100 mole percent CO. Preferred conditions include greater than about 90 mole percent CO, a pressure of up to about 800 p.s.i.g. and a temperature of about 100–180° F. The CO treatment generally serves both to convert the elemental metals, especially nickel and iron, to volatile carbonyls and to remove the carbonyls.

It has further been found that treatment of a metals contaminated catalyst with a chlorinating agent at a moderately elevated temperature is of value in removing the vanadium and iron sulfides from the catalyst as volatile chlorides, and in converting nickel sulfide to soluble nickel-chlorine compounds. This type of treatment is described in copending application Serial No. 849,199, filed October 28, 1959, incorporated herein by reference.

A conversion to chloride after the high temperature sulfiding treatment preferably makes use of vapor phase chlorination at a moderately elevated temperature up to about 700 or even 1000° F. wherein the catalyst composition and structure is not materially harmed by the treatment and a substantial amount of the poisoning metals content is converted to chlorides. The conversion to chloride is generally performed after the sulfiding. The chlorination takes place at a temperature of at least about 300° F., preferably about 550 to 650° F., with optimum results being obtained close to about 600° F. The chlorinating reagent is a vapor which contains chlorine, preferably in combination with carbon or sulfur. Such reagents include molecular chlorine but preferably are the chlorine substituted light hydrocarbons, such as carbon tetrachloride, which may be used as such or formed in-situ by the use of, for example, a vaporous mixture of chlorine gas with low molecular weight hydrocarbons such as methane, n-pentane, etc. The chlorination may take about 5 to 120 minutes, more usually about 20 to 60 minutes, but shorter or longer reaction periods may be possible or needed, for instance, depending on the linear velocity of the chlorinating vapors. Generally, the major proportion of volatile chlorides is removed during contact with the chlorinating vapor and where the volatile chlorides are insufficiently removed, a purge with an inert gas such as nitrogen at an elevated temperature up to about 700 or 1000° F. may be applied to the chlorinated catalyst. When chlorination is practiced on the sulfided catalyst, it is generally followed by the aqueous wash for nickel removal as described above, but may not be where carbonylation is employed for nickel and iron removal in the vapor phase.

Sulfiding is employed with particular advantage in the procedures described above when it is desired to remove primarily nickel poisons from the used hydrocarbon conversion catalyst. In addition, these procedures serve to remove a significant amount of the iron poison in the catalyst and some vanadium. Before any procedures are employed, subjecting the poisoned catalyst sample to magnetic flux may be found desirable to remove any tramp iron particles which may have become mixed with the catalyst. Vanadium poison removal can be increased when, after the slightly acid aqueous wash for removal of nickel and other metals subsequent to oxidation or other conversion of the sulfide, the catalyst is washed with a basic aqueous solution, containing, for instance, ammonium ions as described in copending application Serial No. 39,810, filed June 30, 1960. Even greater vanadium removal is obtained when, upon removal of the poisoned catalyst from the conversion system, it is regenerated and given a treatment at elevated temperatures with a molecular oxygen-containing gas prior to sulfiding and other treatments.

Regeneration of a catalyst to remove carbon is a relatively quick procedure in most commercial catalytic conversion operations. For example, in a typical fluidized cracking unit, a portion of catalyst is continually being removed from the reactor and sent to the regenerator for contact with air at about 950 to 1200° F., more usually about 1000 to 1150° F. Combustion of coke from the catalyst is rapid, and for reasons of economy only enough air is used to supply the needed oxygen. Average residence time for a portion of catalyst in the regenerator may be on the order of about six minutes and the oxygen content of the effluent gases from the regenerator is desirably less than about ½%. When later oxygen treatment is employed, the regeneration of any particular quantum of catalyst is generally regulated to give a carbon content of less than about 0.5%.

Treatment of the regenerated catalyst with molecular oxygen-containing gas is described in copending application Serial No. 19,313, filed April 1, 1960. The temperature of this treatment is generally in the range of about 1000 to 1800° F. and preferably at least about 50° F. higher than the regeneration temperature but below a temperature where the catalyst undergoes any substantial deleterious change in its physical or chemical characteristics. The catalyst is, as pointed out, in a substantially carbon-free condition during this high-temperature treatment. If any significant amount of carbon is present in the catalyst at the start of this high-temperature treatment, the essential oxygen contact is that continued after carbon removal. In any event, after carbon removal, the oxygen treatment of the essentially carbon-free catalyst is at least long enough to convert a substantial amount of vanadium to a higher valence state, as evidenced by a significant increase, say at least about 10%, preferably at least about 100%, in the vanadium removal in subsequent stages of the process. This increase is over and above that which would have been obtained by the other metals removal steps without the oxygen treatment.

The treatment of a vanadium-poisoned catalyst with molecular oxygen-containing gas prior to sulfiding is preferably performed at a temperature of about 1150 to 1350 or even as high as 1600° F. and usually is at least about 50° F. higher than the regeneration temperature. Little or no effect on vanadium removal is accomplished by treatment at temperatures significantly below about 1000° F., even for an extended time. The upper temperature, to avoid undo catalyst damage, will usually not materially exceed about 1600 or 1800° F. The duration of the oxygen treatment and the amount of vanadium prepared by the treatment for subsequent removal is dependent upon the temperature and the characteristics of the equipment used. The length of the oxygen treatment may vary from the short time necessary to produce an observable effect in the later treatment, say, a quarter of an hour to a time just long enough not to damage the catalyst. In a relatively static apparatus such as a muffle furnace, the effectiveness of the treatment can increase with the time over a rather extended period; in other types of apparatus, however, such as a flow reactor, where there is more thorough contact of catalyst and gas, little increase in effectiveness was observed after about four hours of treatment.

The oxygen-containing gas used in the treatment contains molecular oxygen as the essential active ingredient. The gas may be oxygen, or a mixture of inert gas with oxygen, such as air or oxygen-enriched air. The partial pressure of oxygen in the treating gas may range widely, for example, from about 0.1 to 30 atmospheres, but usually the total gas pressure will not exceed about 25 atmospheres. As the oxygen partial pressure increases the time needed to increase the valence of a given amount of vanadium in general decreases. The factors of time, partial pressure and extent of vanadium conversion may be chosen with a view to the most economically feasible set of conditions. It is preferred to continue the oxygen treatment for at least about 15 or 30 minutes with a gas containing at least about 1%, preferably at least about 10% oxygen.

As previously stated, vanadium may be removed from the catalyst by washing it with a basic aqueous solution. The pH is frequently greater than about 7.5 and the solution preferably contains ammonium ions. The solution should be substantially free, before contact with the catalyst, of any contaminant materials which would remain deposited on the catalyst. The ammonium ions may be $NH_4^+$ ions or organic-substituted $NH_4^+$ ions such as methyl ammonium and quaternary hydrocarbon radical ammoniums. The aqueous wash solution can be prepared by addition of a dry reagent or a concentrated solution of the reagent to water, preferably distilled or deionized water. Ammonia or methylamine gas may be dissolved directly in water. An aqueous solution of $NH_4OH$ is highly preferred, the preferred solutions having a pH of about 8 to 11.

The amount of ammonium ion in the solution is sufficient to give the desired vanadium removal and will often be in the range of about 1 to 25 or more pounds per ton of catalyst treated. Five to fifteen pounds is the preferred ammonium range but the use of more than about 10 pounds does not appear to increase vanadium removal unless it increases pH. The temperature of the wash solution does not appear to be significant in the amount of vanadium removed, but may vary within wide limits. The solution may be at room temperature or below, or may be higher. Temperatures above 215° F. require pressurized equipment, the cost of which does not appear to be justified. The temperature, of course, should not be so high and the contact should not be so long as to seriously harm the catalyst. The time of contact also may vary within wide limits, so long as thorough contact between the catalyst and the wash solution is assured. Very short contact times, for example, about 1 minute, are satisfactory, while the time of washing may last 2 to 5 hours or longer. The mechanism of the ammonium washing step of this invention may be one of simultaneous conversion of vanadium to salt form and removal by the aqueous ammonium wash; however, this invention is not to be limited by such a theory.

Since a slightly acidic solution is desirable for nickel removal, the acidic aqueous wash preferably takes place before the ammonium wash. After the latter of these washes, the catalyst slurry can be filtered to give a cake which may be reslurried with water or rinsed in other ways, such as, for example, by a water wash on the filter, and the rinsing may be repeated, if desired, several times. A repetition of the ammonium wash without other treatments seems to have little effect on vanadium removal if the first washing has been properly conducted. However, repetition of the basic aqueous ammonium wash after, for example, a repeated high temperature oxygen treatment does serve to further diminish the vanadium content of the catalyst.

After the final treatment which may be used in the catalyst demetallization procedure, the catalyst is conducted to a hydrocarbon conversion system, for instance, to the catalyst regenerator. The catalyst may be returned as a slurry in the final aqueous wash medium, or it may be desirable first to dry the catalyst filter cake or filter cake slurry at say about 250 to 450° F. and also, prior to reusing the catalyst in the conversion operation it can be calcined, say at temperatures usually in the range of about 700 to 1300° F. A fluidized solids technique is recommended for the sulfiding and other vapor contact processes used in any selected demetallization procedure as a way to shorten the time requirements. Also, further metals content frequently may be removed by repeated or other treatments. Inert gases frequently may be employed after contact with reactive vapors to remove any of these vapors entrained in the catalyst or to purge the catalyst of reaction products.

The catalyst to be treated may be removed from the hydrocarbon conversion system—that is, the stream of catalyst which in most conventional procedures is cycled between conversion and regenerating operations—before the poison content reaches about 5000 to 10,000 p.p.m., the poisoning metals being calculated as their common oxides. Generally, at least about 250 or 500 p.p.m. nickel will be accumulated on the catalyst before demetallization is warranted. A small portion of the catalyst is preferably removed from the hydrocarbon conversion system and sulfided after the conventional oxidation regeneration which serves to remove carbonaceous deposits. The treatment of this invention is effective despite the presence of a small amount of carbon on the treated catalyst, but preferably the regeneration is continued until the catalyst contains not more than about 0.5% carbon before a subsequent oxygen treatment. Where the catalyst is subjected to the oxygen treatment before it is substantially carbon free, the length of oxygen treatment, as recited above, is reckoned from the time that the catalyst reaches the substantially carbon-free state, that is the state where little, if any, carbon is burned even when the catalyst is contacted with oxygen at temperatures conducive to combustion.

The amount of Ni, V or Fe removed in practicing the procedures outlined or the proportions of each which are removed may be varied by proper choice of treating conditions. It may prove necessary, in the case of very severely poisoned catalysts, to repeat the treatment to reduce the metals to an acceptable level, perhaps with variations where one metal is greatly in excess. A further significant advantage of the process lies in the fact that the overall metals removal operation, even if repeated, does not unduly deleteriously affect the activity, selectivity, pore structure and other desirable characteristics of the catalyst. Any given step in the demetallization treatment is usually continued for a time sufficient to effect a substantial conversion or removal of poisoning metal and ultimately results in a substantial increase in metals removal compared with that which would have been removed if the particular step had not been performed. The actual time or extent of treating depends on various factors and is controlled by the operator according to the situation he faces, e.g. the extent of metals content in the feed, the level of conversion unit tolerance for poison, the sensitivity of the particular catalyst toward a particular phase of the demetallization procedure, etc.

In practice the process could be applied in a refinery by removing a portion of catalyst from the regenerator or regenerator standpipe of the cracking system after a standard regeneration treatment to remove a good part of the carbon, heating this portion of the catalyst inventory in air to the temperature and for the length of time found to be sufficient for vanadium removal without catalyst damage, sulfiding and oxidizing or chlorinating the catalyst and slurrying it first in water for the slightly acid wash, filtering, and reslurrying the catalyst in the ammonium ion-containing solution. The treated catalyst can be returned to the unit, for example, to the regenerator, reducing greatly the new catalyst requirement. The following examples are illustrative of the invention but should not be considered limiting.

EXAMPLE I

A 15 g. sample of base catalyst P, a synthetic gel silica-alumina fluid type cracking catalyst poisoned to 726 p.p.m. NiO and 2510 p.p.m. $V_2O_5$ and 0.364% Fe by use in a pilot plant operation cracking a petroleum gas oil hydrocarbon stock containing tramp iron as well as nickel, vanadium and iron naturally present in the feedstock was leached three times with 75 ml. portions of 0.75 M NH₄Cl solution, each for one hour at 180–200° F. The catalyst was filtered and washed free of chloride between each leaching. The first filtrate showed a trace of Ni by dimethylglyoxime test. The second and third showed no metals other than a very faint trace of Al. The catalyst analyzed 705 p.p.m. NiO and 1920 p.p.m. $V_2O_5$, reductions of 3 and 23%, respectively.

EXAMPLE II

A sample of the same base catalyst P was treated with a stream of equimolar $N_2/H_2S$ for 3 hours at 900° F. The cooled, jet-black product was leached with 0.75 M NH₄Cl solution in the manner of Example I. Again, only the first filtrate contained Ni; all contained Fe. Analysis shows a reduction in NiO, $V_2O_5$ and Fe of 54%, 38% and 31%, respectively, showing the improvement due to the sulfiding step of this invention.

EXAMPLE III

An aqueous solvent was formed by suspending 0.3 gram of Sequestrene AA (a free acid form of ethylene diamine tetraacetic acid) in distilled water and adding the minimum amount (3 drops) of ammonium hydroxide required to effect solution. This solution was diluted and added to a sample of base catalyst P which had been sulfided in the manner of Example II. Analysis showed a reduction in NiO, $V_2O_5$ and Fe comparable to the quantities removed by the ammonium chloride treatment of Example II.

EXAMPLE IV

Example IV employs gaseous oxidation to convert sulfides. A sample of base catalyst P was treated in a fluidized bed with an equimolar mixture of $N_2$ and $H_2S$ for 3 hours at 1050° F. The catalyst was cooled in nitrogen and heated, in about one-half hour, to 900° F. in a stream of oxygen. On reaching 900° F. the catalyst was immediately cooled, in $O_2$, to room temperature. The oxidized catalyst was washed 3 times by heating to boiling, as a water slurry, filtering and rinsing with cold water between the boiling water treatments. The first filtrate was slightly acid, since it contained much $SO_4$ ion concentration, and also contained considerable Ni and V and traces of Fe. The second filtrate showed traces of Ni and $SO_4$. The third filtrate contained no metals or $SO_4$. Analysis showed reductions in the catalyst of 51% in NiO, 4% in $V_2O_5$ and 3% in Fe.

EXAMPLES V AND VI

These examples illustrate the use of chlorination and water washing for removal of metal poisons after sulfidation. Base catalyst Q was a "Nalcat" synthetic gel silica-alumina finely divided fluid-type cracking catalyst composed of about 25% $Al_2O_3$, substantially the rest $SiO_2$. This catalyst was used in a commercial catalytic cracking conversion unit, using conventional fluidized catalyst techniques, including cracking and air regeneration to convert a feedstock (A) comprising a blend of Wyoming and Mid-Continent gas oils containing about 1.2 p.p.m. vanadium, about 0.3 p.p.m. nickel, about 1.0 p.p.m. iron and about 2 weight percent sulfur. This gas oil blend had a gravity (API) of 24°, a carbon residue of about 0.3 weight percent and a boiling range of about 500 to 1000° F. When this catalyst had an iron content of 0.27%, a nickel content of 327 p.p.m. and a vanadium content of 4240 p.p.m., measured as the common oxides, a portion was removed from the cracking system after regeneration. A batch of this base catalyst sample was used to test-crack a petroleum hydrocarbon East Texas gas oil fraction (feedstock B) having the following approximate characteristics.

| | | |
|---|---|---|
| IBP | ° F | 490–510 |
| 10% | ° F | 530–550 |
| 50 | ° F | 580–600 |
| 90% | ° F | 650–670 |
| EP | ° F | 690–710 |
| Gravity (API) | degrees | 33–35 |
| Viscosity (SUS) at 100° F | | 40–45 |
| Aniline point | ° F | 170–175 |
| Pour point | ° F | 35–40 |
| Sulfur | percent | 0.3 |

The results of this cracking are given in Table I below.

A 200 g. sample of this catalyst has heated for 1⅓ hours at 1000° F. in a bed fluidized with air, followed by stripping with nitrogen. The stripped catalyst was then heated in a bed fluidized with hydrogen sulfide for 1½ hours at 1150° F., and cooled to 600° F. A portion of this sample (V) was treated at 600° F. for an hour with a mixture of chlorine and carbon tetrachloride sufficient to supply about 50% of chlorine by weight of the catalyst and about 8% of $CCl_4$ by weight of the catalyst. The other portion of sulfided catalyst (VI) was chlorinated at 600° F. with a chlorinating agent supplying 7.3% chlorine and 1.2% $S_2Cl_2$ by weight of the catalyst. After the chlorination treatment each catalyst sample was quickly washed with water and then sent to test cracking of feedstock B. Table I below reports the results of this cracking as well as the extent of metals removal.

*Table I*

| Sample | Base Q | V | VI |
|---|---|---|---|
| Percent Metals Removal: | | | |
| Ni | | 65 | 80 |
| V | | 12 | 28 |
| Fe | | 16 | 16 |
| Test Cracking: | | | |
| Relative Activity | 34.6 | 42.3 | 46.7 |
| Distillate+Loss | 33.1 | 36.9 | 38.8 |
| Gas factor | 1.62 | 1.29 | 1.42 |
| Coke factor | 1.30 | 0.94 | 1.21 |
| Gas gravity | 1.08 | 1.27 | 1.17 |

EXAMPLE VII

Examples VII and VIII show liquid-phase oxidation of sulfides. A 15 gram sample of base catalyst P was treated 6 hours at 900° F. with $H_2S$ at atmospheric pressure and leached with an aqueous solution containing 0.43 ml. 6 N $H_2SO_4$ and 2.5 ml. 3% $H_2O_2$, filtered and washed. Analysis showed reductions in NiO of 43%, in $V_2O_5$ of 65% and in Fe of 33%.

EXAMPLE VIII

Base poisoned catalyst S was similar in composition to base catalyst Q and had a nickel content of 332 p.p.m., a vanadium content of 4366 p.p.m. and an iron content of 4888 p.p.m. when it was removed from a commercial cracking operation on feedstock A described above and regenerated. A batch of this catalyst was removed from the cracking system and used to test-crack feedstock B with the results reported in Table II below for sample VIIIa. After a treatment by magnetic flux the catalyst sample was reduced in iron content to 3965 p.p.m. and was denominated sample VIIIb. This sample was subjected to the action of $H_2S$ gas for four hours at 1050° F. and then slurried for 60 minutes in an aqueous solution having a pH of about 3–5 and containing 25.7 pounds $HNO_3$ and 40 pounds $H_2O_2$ per ton of catalyst. The slurry contained 20% solids and had a temperature of 212° F. This sample (VIIIc) had the metals content reported in Table II. The percentage figures reported for metals removal for this sample are based on the metals content of sample VIIIb. After drying and calcination for 2½ hours at about 1050° F. a portion of this sample was steam-stabilized at 1150° F. for 6 hours and was used for the test cracking of feedstock B with the results reported in Table II.

The other portion of VIIIc was again subjected to the same sulfiding, oxidizing and calcination steps as before. A sample, VIIId, of this portion had the characteristics and cracking effects on feedstock B reported in Table II. The rest of this portion was given a third sulfiding, oxidizing and calcination treatment. This was sample VIIIe, part of which was used in cracking feedstock B and part of which was given a fourth demetallization treatment as above (sample VIIIf). Sample VIIIg was a portion of VIIIf which was calcined in air for 24 hours before being used in the cracking process on feedstock A. Sample VIIIh is the virgin unpoisoned catalyst.

In the table, RA stands for relative activity, D+L for distillate plus loss, a measure of the conversion to products lower-boiling than the feed, GF for gas factor, CF for coke factor and HPF for hydrogen producing factor.

*Table II*

| Sample | VIIIh | VIIIa | VIIIc | VIIId | VIIIe | VIIIf | VIIIg |
|---|---|---|---|---|---|---|---|
| Metals Content: | | | | | | | |
| Fe (p.p.m.) | | 4,888 | 2,920 | 2,745 | 1,980 | 1,765 | 1,765 |
| NiO (p.p.m.) | | 332 | 161 | 111 | 105 | 89 | 89 |
| $V_2O_5$ (p.p.m.) | | 4,366 | 4,160 | 3,400 | ² 2,475 | 2,575 | 2,575 |
| Percent Metals Removed: | | | | | | | |
| Fe | | | 26.4 | 30.8 | 50.0 | 55.5 | 55.5 |
| NiO ¹ | | | 55.6 | 69.4 | 71.1 | 75.5 | 75.5 |
| $V_2O_5$ ¹ | | | 8.7 | 24.6 | 45.0 | 43.0 | 43.0 |
| Cracking Activity: | | | | | | | |
| Percent Gaso | 27.7 | 20.7 | 20.6 | 25.1 | 23.7 | 23.7 | 25.3 |
| Percent Gas | 19.5 | 12.6 | 12.5 | 12.7 | 12.6 | 13.5 | 18.9 |
| Percent Coke | 2.9 | 2.8 | 3.4 | 3.1 | 3.2 | 2.4 | 4.0 |
| Percent Conv | 50.1 | 36.1 | 36.5 | 40.9 | 39.5 | 39.6 | 48.2 |
| Gas Grav | 1.47 | 0.96 | 0.87 | 1.22 | 1.14 | 1.20 | 1.23 |
| R.A. | 54.5 | 26.4 | 27.1 | 35.0 | 32.8 | 33.0 | 50.5 |
| D+L | 41.9 | 28.0 | 28.5 | 33.2 | 32.1 | 32.2 | 40.4 |
| G.F. | 1.00 | 1.89 | 2.04 | 1.18 | 1.35 | 1.37 | 1.25 |
| C.F. | 0.75 | 1.57 | 1.85 | 1.30 | 1.45 | 1.09 | 1.13 |
| HPF | 38 | 291 | 303 | 121 | 150 | 149 | |

¹ The relative contents of NiO and $V_2O_5$ analyzed higher after the poisoned catalyst was magnetically treated.
² Estimated.

EXAMPLE IX

Examples IX and X show the use of sulfiding with subsequent conversion of contaminants to volatile form.

Base catalyst T is removed from cracking feedstock A when the poison level is 245 p.p.m. NiO, 2390 p.p.m. $V_2O_5$ and 0.404% Fe. A sample of this catalyst is regenerated and sulfided with $H_2S$ at 900° F. and 100 p.s.i.g. for 3 hours. 60 grams of this catalyst is contacted at 900° F. and 700 p.s.i.g. for 3 hours with 0.52 cubic feet of hydrogen per hour. This reduced catalyst is then cooled to 180° F. and treated with carbon monoxide for 6 hours at 800 p.s.i.g. Analysis of the treated catalyst shows a 23% reduction in nickel and a 12% reduction in iron content.

EXAMPLE X

A 3000 gram sample of base poisoned catalyst W which had a composition similar to catalyst Q and had been poisoned in cracking feedstock A to an iron content of 2880 p.p.m., a nickel content of 328 p.p.m. and a vanadium content of 4320 p.p.m., was treated by air at 1300° F. for 4 hours. This catalyst sample was then cooled to 1175° F. at which temperature it was sulfided with $H_2S$ for 1½ hours. The removal of vanadia and iron was next accomplished by treating this catalyst at 600° F. with a mixture of 5% $CCl_4$ and 2% of $Cl_2$ (both based on the weight of the catalyst) for 1 hour. The 1.3% residual chlorine left on the catalyst was removed by treatment at 900° F. for 6 hours with a stream of hydrogen. This treatment served to reduce the nickel chloride on the catalyst as well as lower the chloride value to less than 0.005%. The reduced catalyst was purged for ten minutes with dry nitrogen at 900° F. to remove excess moisture. It was then subjected to a carbon monoxide treat at 180° F. and 800 p.s.i.g. for 6 hours to remove nickel from the catalyst surface as a carbonyl. The following Table III gives the results of this treatment and also the results of the test cracking of feedstock B by the catalyst before and after demetallization.

*Table III*

| | Base Catalyst W | After Chlorination | Final Catalyst |
|---|---|---|---|
| P.p.m NiO | 327 | 327 | 81 |
| P.p.m. $V_2O_5$ | 4,320 | 3,202 | 3,202 |
| Percent Fe | 0.288 | 0.218 | 0.218 |
| Percent $Cl_2$ | ~0.008 | 1.3 | 0.005 |
| RA | 34.2 | | 47.0 |
| GF | 1.62 | | 1.22 |
| CF | 1.25 | | 1.01 |
| Gas Gravity | 1.10 | | 1.31 |

EXAMPLE XI

This example employs sulfidation with molecular oxygen treatment and an ammonium wash for vanadium removal. A 600 gram sample of the base poisoned catalyst W was air treated for 2 hours at 1300° F., sulfided for 1 hour with $H_2S$ at 1150° F. and oxidized with an $HNO_3$ aqueous solution through which air was bubbled. The filter cake from the $HNO_3$ treatment was divided into 3 equal parts. The first portion XIa was washed on the filter with 1 liter of 72° F. water, slurried 10 minutes in 1 liter 180° F. water, filtered and again washed with 1 liter 72° F. water on the filter. The filter cake was slurried 10 minutes at 180° F. in 800 ml. of an $NH_4OH$ solution which provided 10 lbs. $NH_3$/ton of catalyst, washed in the manner described, dried and calcined. The second portion XIb was washed on the filter with 3 liters 72° F. water before and after the same type of $NH_4OH$ leaching as above. The third sample XIc was prepared in the same manner as was XIb except that the water used for displacement washing was preheated to 180° F. Results obtained are shown in Table IV below.

*Table IV*

| Sample No | XIa | XIb | XIc |
|---|---|---|---|
| Washing: | | | |
| Method | Reslurry | Displacement. | Displacement. |
| Vol. Wash Water, ml | 3,000 | 3,000 | 3,000 |
| Wash Temp., °F | 72/180/72 | 72 | 180 |
| Analysis: | | | |
| P.p.m. Fe | 2,100 | 2,080 | 2,045 |
| P.p.m. NiO | 137 | 139 | 137 |
| P.p.m. $V_2O_5$ | 3,265 | 3,345 | 3,287 |
| Percent Metals Removal: | | | |
| Fe | 22.6 | 23.4 | 24.8 |
| NiO | 60.5 | 59.9 | 60.5 |
| $V_2O_5$ | 27.3 | 25.6 | 26.8 |
| Test Cracking: | | | |
| Relative Activity | 47.6 | 45.7 | 47.2 |
| D+L | 39.1 | 38.5 | 39.0 |
| Gas Factor | 1.50 | 1.54 | 1.44 |
| Coke Factor | 1.20 | 1.24 | 1.22 |
| Gas Gravity | 1.13 | 1.10 | 1.16 |

It will be observed from these examples that sulfiding a poisoned catalyst according to this invention is a valuable step in the removal of poisoning metals from such a catalyst.

What is claimed is:

1. A method for producing gasoline in a hydrocarbon cracking system having a catalytic cracking zone and a catalyst regeneration zone which comprises cracking at elevated temperature in said cracking zone a hydrocarbon feedstock heavier than gasoline and containing nickel contaminant, said cracking being conducted in the presence of a synthetic gel, silica-based hydrocarbon cracking catalyst and during which cracking the catalyst becomes contaminated with nickel of said hydrocarbon feedstock, cycling the catalyst between the cracking zone and the catalyst regeneration zone in which latter zone carbon is removed from the catalyst, bleeding a portion of the nickel-contaminated catalyst from the cracking system, sulfiding bled catalyst by preliminary contact with hydrogen sulfide at a temperature of about 800–1300° F. to increase nickel removal from said catalyst, and subsequently removing nickel from the sulfided catalyst without undue deleterious change in the physical and chemical characteristics of the catalyst, and returning resulting denickelized catalyst to the hydrocarbon cracking system.

2. The method of claim 1 wherein the catalyst is silica-alumina.

3. The method of claim 2 in which the subsequent removal of nickel from the hydrogen sulfide treated catalyst is through conversion of the nickel contaminant to a form dispersible in an aqueous medium and contacting the catalyst with an aqueous medium to remove nickel.

4. The method of claim 3 in which the preliminary hydrogen sulfide contact is at a temperature of about 900–1200° F.

References Cited in the file of this patent
UNITED STATES PATENTS

| | | |
|---|---|---|
| 2,129,693 | Houdry | Sept. 13, 1938 |
| 2,414,736 | Gray | Jan. 21, 1947 |
| 2,466,050 | Shabaker et al. | Apr. 5, 1949 |
| 2,466,051 | Shabaker et al. | Apr. 5, 1949 |
| 2,488,718 | Forrester | Nov. 22, 1949 |
| 2,683,683 | Mills | July 13, 1954 |